United States Patent
Kim et al.

(10) Patent No.: US 8,928,452 B2
(45) Date of Patent: Jan. 6, 2015

(54) REMOTE CONTROL DEVICE AND REMOTE CONTROL METHOD USING THE SAME

(75) Inventors: Jongcheol Kim, Seoul (KR); Jongsoon Park, Seoul (KR); Jinyung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 769 days.

(21) Appl. No.: 12/856,455

(22) Filed: Aug. 13, 2010

(65) Prior Publication Data

US 2011/0037609 A1 Feb. 17, 2011

Related U.S. Application Data

(60) Provisional application No. 61/233,834, filed on Aug. 14, 2009.

(30) Foreign Application Priority Data

| Sep. 7, 2009 | (KR) | ........................ 10-2009-0084215 |
| Sep. 11, 2009 | (KR) | ........................ 10-2009-0086157 |
| Sep. 23, 2009 | (KR) | ........................ 10-2009-0090025 |

(51) Int. Cl.

| G08C 17/02 | (2006.01) |
| G06F 3/0484 | (2013.01) |
| G06F 3/0488 | (2013.01) |
| G08C 23/04 | (2006.01) |
| H04N 21/422 | (2011.01) |
| H04N 5/44 | (2011.01) |

(52) U.S. Cl.
CPC ............ *G08C 17/02* (2013.01); *G06F 3/04847* (2013.01); *G06F 3/04883* (2013.01); *G08C 23/04* (2013.01); *H04N 21/42208* (2013.01); *H04N 21/42222* (2013.01); *H04N 21/42224* (2013.01); *H04N 21/42225* (2013.01); *G08C 2201/32* (2013.01); *H04N 2005/4428* (2013.01)

USPC .... 340/4.3; 340/12.22; 348/734; 348/211.99; 348/211.1; 348/211.3; 725/81; 345/169

(58) Field of Classification Search
CPC .................. H04N 21/42208; H04N 21/42222; H04N 5/4403; H04N 21/42204; H04N 21/42209; H04N 21/42225; H04N 13/0497; H04N 21/4126; H04N 2005/4408; H04N 2005/441; H04N 21/42207; H04N 21/4222; H04N 21/4312
USPC .......... 340/3.1, 3.3, 3.31, 3.32, 3.7, 3.71, 4.3, 340/4.31, 4.32, 4.33, 4.37, 12.22–12.29; 348/734, 211.99–211.14; 725/81–85; 345/169
See application file for complete search history.

(56) References Cited

U.S. PATENT DOCUMENTS

| 6,255,961 | B1 * | 7/2001 | Van Ryzin et al. ............. 340/3.1 |
| 2004/0158854 | A1 * | 8/2004 | Nagasawa et al. ............... 725/38 |
| 2007/0136778 | A1 * | 6/2007 | Birger et al. ................... 725/117 |
| 2007/0210932 | A1 * | 9/2007 | Koshiba et al. ........... 340/825.69 |

FOREIGN PATENT DOCUMENTS

| KR | 10-2003-0090737 A | 11/2003 |
| KR | 10-2004-0041778 A | 5/2004 |

(Continued)

*Primary Examiner* — Phung Nguyen
*Assistant Examiner* — John Bamert
(74) *Attorney, Agent, or Firm* — Birch, Stewart, Kolasch & Birch, LLP

(57) ABSTRACT

A remote control device and method is provided. The remote control device and method provides a more intuitive and convenient user interface to a user. The remote control device and method also makes it possible to transmit/execute contents, provided by an external device, to/in a target device more intuitively and conveniently.

13 Claims, 19 Drawing Sheets

(56) References Cited

FOREIGN PATENT DOCUMENTS

| WO | WO 02/089518 A1 | 11/2002 |
| WO | WO 03/056531 A1 | 7/2003 |
| WO | WO 2004/047011 A2 | 6/2004 |
| WO | WO 2004047011 A2 * | 6/2004 ............ G06K 11/00 |

* cited by examiner

REMOTE CONTROL DEVICE AND REMOTE CONTROL METHOD USING THE SAME

CROSS-REFERENCE TO RELATED APPLICATIONS

The present application claims the benefit of priority under 35 U.S.C. §119 to Korean Patent Application No. 10-2009-0090025 filed on Sep. 23, 2009, Korean Patent Application No. 10-2009-0086157 filed on Sep. 11, 2009, Korean Patent Application No. 10-2009-0084215 filed on Sep. 7, 2009, and Provisional Application No. 61/233,834 filed on Aug. 14, 2009, which are hereby incorporated by reference in their entirety.

BACKGROUND OF THE INVENTION

1. Field of the Invention

The present invention relates to a remote control device and method, and more particularly, to a remote control device and method for synthesizing/displaying an actual image of an external device connected to a target device and a virtual image of contents provided by the external device.

2. Discussion of the Background Art

There are remote controllers that control electronic devices such as televisions (TVs), DVD players, games, and audios. Such remote controllers use infrared rays to transmit binary codes to electronic devices, thereby controlling the volume, channel and operation mode of the electronic devices.

Recently, an integrated remote controller capable of controlling a plurality of electronic devices solely by one remote controller has been launched according to an increase in the type and number of electronic devices provided in a home.

However, such an integrated remote controller has failed to provide other additional conveniences than the convenience of integrating remote controllers of electronic devices.

What is therefore required is a new remote control device that can control electronic devices more conveniently and intuitively.

SUMMARY OF THE INVENTION

The present invention provides a remote control device and method for providing a more intuitive and convenient user interface to a user.

The present invention also provides a remote control device and method for transmitting/executing contents, provided by an external device, to/in the target device more intuitively and conveniently.

In an embodiment, there is an automatic control device for remotely controlling a target device that includes: a camera unit capturing an image of an external device connected to target device; a communication unit receiving information of contents provided by the external device and transmitting a control signal to the target device or the external device; a display unit displaying a captured actual image of the external device and a virtual image of the contents; and a control unit generating the virtual image on the basis of the received contents information and performing a control operation to display a synthesized image of the actual image and the virtual image.

In another embodiment, there is an automatic control method for remotely controlling a target device that includes: capturing an image of an external device connected to target device; receiving information of contents provided by the external device; generating a virtual image of the contents on the basis of the received contents information; and performing a control operation to display a synthesized image of the captured actual image of the external device and the virtual image.

The present invention provides a more intuitive and convenient user interface to a user.

The present invention also makes it possible to transmit/execute contents, provided by an external device, to/in a target device more intuitively and conveniently.

It is to be understood that both the foregoing general description and the following detailed description of the present invention are exemplary and explanatory and are intended to provide further explanation of the present invention.

BRIEF DESCRIPTION OF THE DRAWINGS

The accompanying drawings, which are included to provide a further understanding of the present invention and are incorporated in and constitute a part of this application, illustrate embodiment(s) and together with the description serve to explain the principle of the present invention. In the drawings.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

Hereinafter, exemplary embodiments of the present invention will be described in detail with reference to the accompanying drawings.

Figure 1:
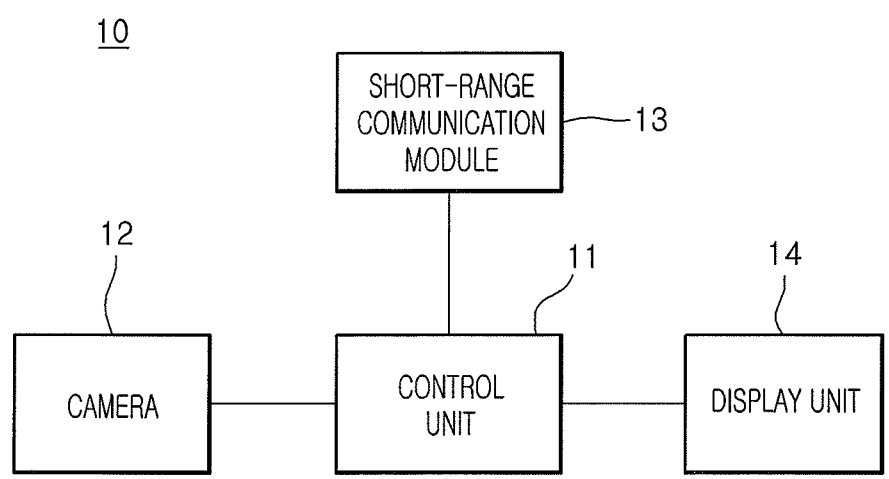
FIG. 1 is a block diagram of a remote control device in accordance with an embodiment of the present invention.

FIG. 1 is a block diagram of a remote control device in accordance with an embodiment of the preset invention.

Referring to FIG. 1, a remote control device 10 in accordance with an embodiment of the preset invention may include: a camera 12 capturing an image of a target device; a short-range communication module 13 transmitting a control command to the target device and communicating with the target device; a display unit 14 displaying the captured actual image of the target device or a virtual image related to the target device; and a control unit 11 generating a control signal for control of the target device, generating the virtual image related to the target device, and controlling the actual image and the virtual image to be displayed in a synthesized manner.

The target device may be an electronic device controlled by the remote control device 10. For example, the target device may be a broadcast receiving device (e.g., TV) or an image display device equipped with a display unit. In embodiments, the target device may be one of various external devices (e.g., DVD players, Blu-ray players, VCRs, PCs, MP3 players, audios, DVix players, and games) that are connected to the broadcast receiving device or the image display device. However, the target devices are not limited to the above described entertainment devices. The target devices may also be home appliances such as washers, dryers, air conditioners, refrigerators and other kitchen appliances. The target device may also be a computer or other personal information processing device such as an electronic tablet or the like. The target device may also be a vending machine. The target device may be an automobile.

The camera 12 captures an image of the target device and transfers the captured image to the control unit 11. The camera 12 may be a camera module installed in a mobile terminal such as a mobile phone.

The short-range communication module 13 communicates with the target device, transfers a command of the remote control device 10, and receives data from the target device. The short-range communication module 13 may include one of various communication modules (e.g., Bluetooth modules, infrared communication modules, ZigBee modules, Near Field Communication (NFC) modules, and RF communication modules) or a combination thereof.

The display unit 14 displays an image captured by the camera 12. In an embodiment, the display unit 14 displays a synthesized image of the virtual image generated by the control unit 11 and the actual image of the target device captured by the camera 12 under the control of the control unit 11. In using Bluetooth or infrared or another mechanism, it is possible for the short-range communication module 13 to communicate with a target device that is in a cabinet or in another room. In that case, the display unit 14 again displays a synthesized image of the virtual image generated by the control unit 11 and the actual image of the cabinet or wall captured by the camera 12.

The display unit 14 may include at least one of various information display devices such as LCDs, OLEDs, VFDs and electrophoresis devices.

Also, the display unit 14 may be a touchscreen having a touch panel at a front side thereof. The touch panel may be one of various touch panels such as resistive touch panels and capacitive touch panels.

The control unit 11 controls the above-described units to generate a synthesized image of an actual image captured by the camera 12 and a virtual image related to it. As will be described below, the virtual image may be an image related to a target device photographed. If the target device is a TV, the virtual image may be a channel browsing image for a plurality of channels, or an image including information about external devices connected to the TV. If the target device is one of external devices such as DVD players, Blu-ray players, VCRs, PCs, MP3 players, audios, DVix players and games, the virtual image may be an image including information about contents providable by the external devices.

In an embodiment, a motion sensor may be installed in the remote control device 10 to detect the gesture of a user applied to the remote control device 10. The motion sensor may include at least one of various sensors (e.g., acceleration sensors, gyro sensors, and geomagnetic sensors) that can detect a motion of the remote control device 10.

As will be described below, gestures applied to the remote control device 10 may be detected and various commands may be mapped to the detected gestures. A more intuitive and convenient user interface may be provided to a user by inputting commands by gestures.

Figure 2A:
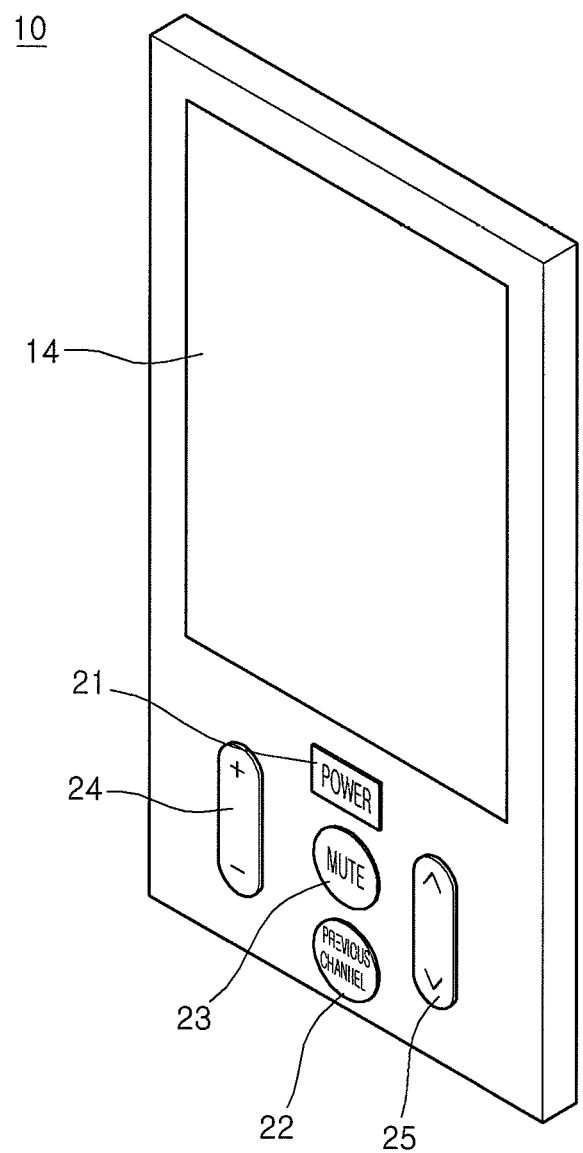
FIGS. 2A and 2B are perspective views of a remote control device 10 in accordance with an embodiment of the present invention.
Figure 2B:
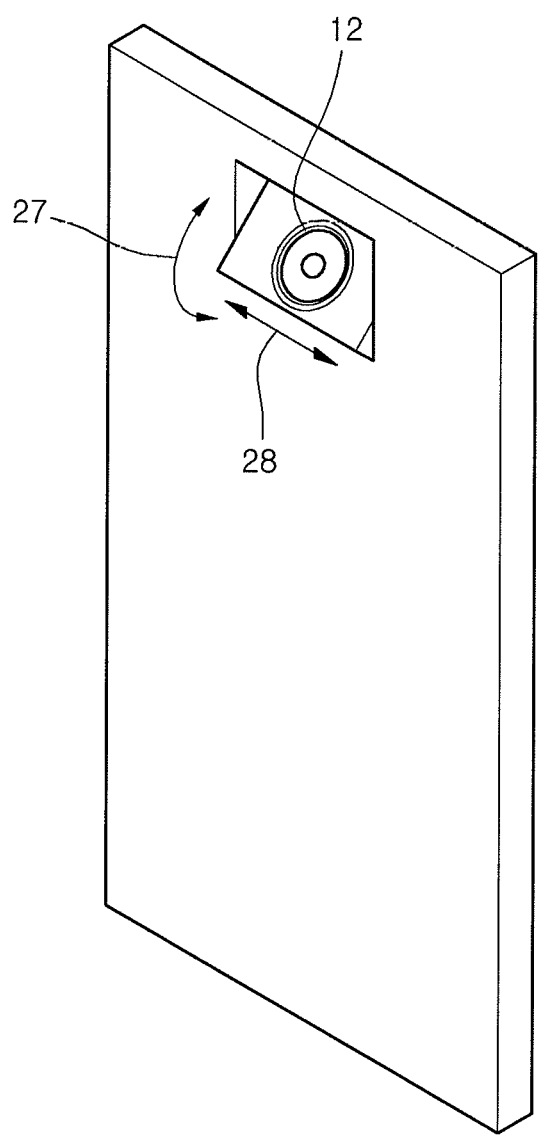

FIGS. 2A and 2B are perspective views of a remote control device 10 in accordance with an embodiment of the preset invention. FIG. 2A is a perspective view of a front side of the remote control device 10, and FIG. 2B is a perspective view of a rear side of the remote control device 10. In an embodiment, the front side of the remote control device 10 may be oriented toward a user and the read side of the remote control device 10 may be oriented toward a target device to be controlled.

As illustrated in FIG. 2A, a display unit 14 is disposed at the front side of the remote control device 10. The display unit 14 may be a touchscreen.

Other control buttons may be disposed at the units other than the display unit 14. The control buttons may include a power button 21, a channel control button 24, a volume control button 25, a mute button 23, and a previous channel button 22. In embodiments, the control buttons may further include various buttons according to the types of target devices. In an embodiment, a touchscreen may be used as the display unit 14 and the control buttons except one or two of the control buttons may be displayed on the touch screen.

Referring to FIG. 2B, a camera 12 is disposed at the rear side of the remote control device 10. The camera 12 may be oriented toward a target device in a capture operation mode. The camera 12 and the display unit 14 may be oriented in the opposite directions. For example, the camera 12 may be oriented toward a target device and the display unit 14 may be oriented toward a user.

In an embodiment, an actuator may be connected with the camera 12 to convert the orientation direction of the camera 12 in a vertical direction 27 or in a horizontal direction 28.

Figure 3:
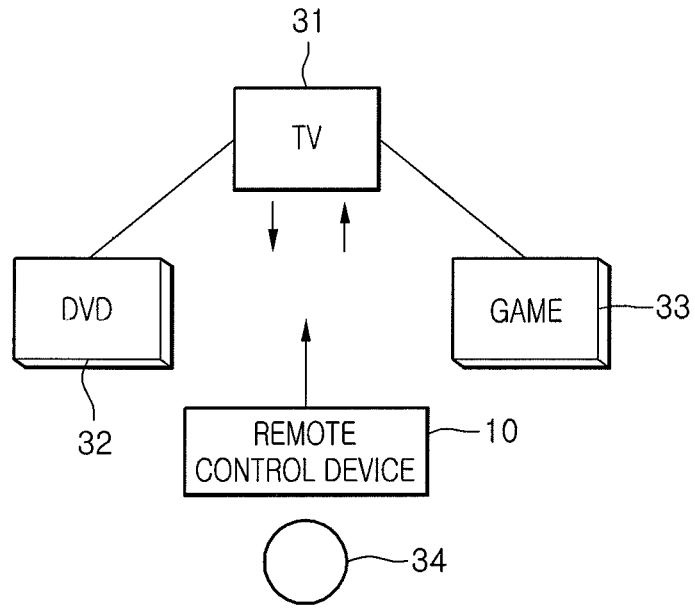
FIGS. 3 and 4 are diagrams illustrating the configuration of a network between an external device and a remote control device 10 in accordance with an embodiment of the present invention.
Figure 4:
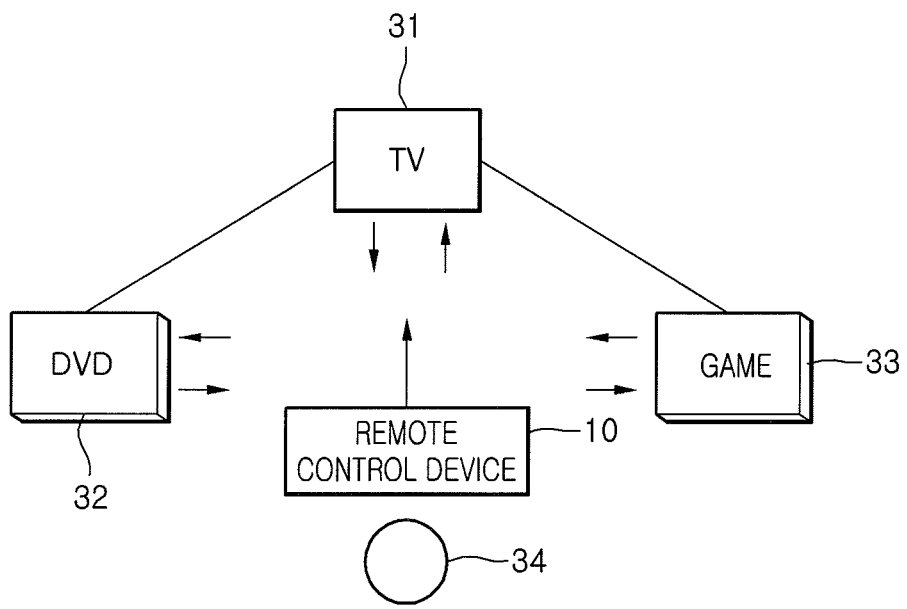

FIGS. 3 and 4 are diagrams illustrating a network configuration between an external device and a remote control device 10 in accordance with an embodiment of the preset invention.

As illustrated in FIG. 3, the remote control device 10 may communicate directly with a TV 31 (one of the target devices) and the TV 31 may communicate with other external devices 32 and in a wired or wireless manner. An image display device without a tuner may be used instead of the TV 31.

In this embodiment, the remote control device 10 communicates with the TV 31. According to a command received from the remote control device 10, the TV 31 transmits a command to the external device 32 and 33 or receives data from the external devices 32 and 33 and transmits the received data to the remote control device 10. To this end, the TV 31 is equipped with a short-range wireless communication module for communication with the remote control device 10, and the external devices 32 and 33 are equipped with a wired or wireless communication module for communication with the TV 31.

The TV 31 or the image display device may display contents received from the external devices 32 and 33. For example, when the DVD player 32 plays and transmits a DVD title to the TV 31, and the TV 31 displays contents included in the DVD title. Also, when a game title is played by the game 33, a game screen is displayed on the TV 31. If the external device is an MP3 player, only sounds may be outputted through the TV 31. If the external device is an audio player, the contents may be an audio disc into a corresponding reader or may be a stored audio file, and the contents information may include Title, Genre, Play Time, Rating Level, Representative Image, and Artist Information.

In an embodiment of the preset invention, as illustrated in FIG. 4, the remote control device 10 may be configured to directly communicate with the external device 32 and 33 as well as with the TV 31. In this case, the external devices 32 and 33 are equipped with a short-range wireless communication module for communication with the remote control device 10, as well as with a wired or wireless communication module for communication with the TV 31.

The short-range wireless communication module installed at the remote control device 10, the TV 31 or the external devices 32 and 33 may be one of various short-range wireless communication modules such as Bluetooth modules, infrared communication modules, ZigBee modules, Near Field Communication (NFC) modules and RF communication modules.

As illustrated in FIGS. 3 and 4, a user 34 may orient the remote control device 10 toward a desired target device to control the target device in various ways.

In various embodiments described below, the user may control the remote control device 10 to change an operation mode thereof. The various embodiments may be implemented when the remote control device 10 is in specific operation modes. The specific operation modes may include a control mode, a menu control mode, and a screen synchronization mode.

In an embodiment of the present invention, contents displayed by the target device, to which the remote control device 10 is oriented, may be displayed on the display unit 14 of the remote control device 10. This operation may be performed when the remote control device 10 is in a screen synchronization mode.

Referring to FIG. 3 or 4, the remote control device 10 is oriented toward the TV 31 in a turned-on state, contents displayed currently on the screen of the TV 31 (i.e., a TV broadcast program or a video image played by the DVD player) may be displayed on the screen of the remote control device 10 without any change.

If the tuner or the TV is an IPTV or a broadband TV, the TV 31 may display a broadcast program received through an Internet cable and may display contents received from the external devices 32 and 33.

Figure 5:
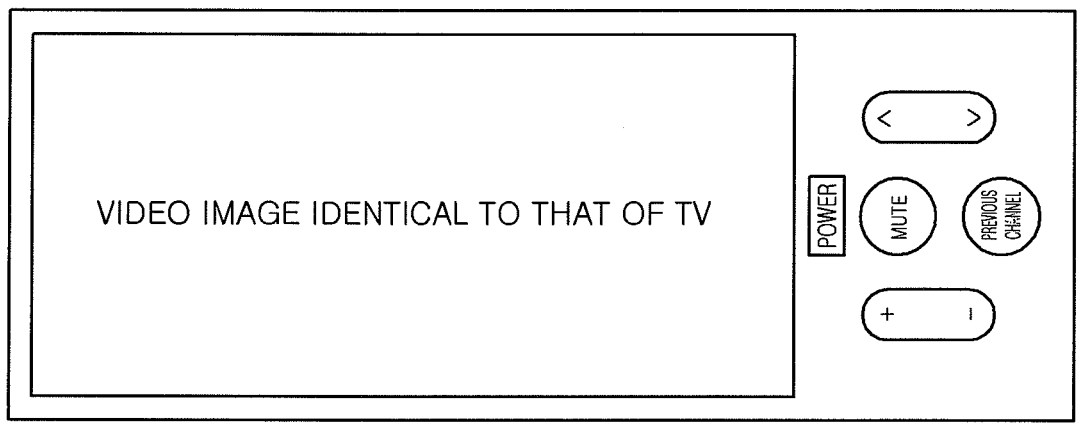
FIGS. 5 to 7 are diagrams illustrating a TV control method in accordance with an embodiment of the present invention.

When the remote control device 10 is oriented toward the TV 31, the control unit 11 of the remote control device 10 determines through the camera 12 that the remote control device 10 is currently oriented toward the TV 31, and may receive the currently-played contents from the TV 31 to display the received contents on the display unit 14, as illustrated in FIG. 5.

The TV 31 transmits displayed image data to the remote control device 10 through the short-range communication module, and the remote control device 10 displays the image data on the display unit 14.

Even if the remote control device 10 (or the camera 12) is oriented toward another place after starting an operation of displaying under-play contents, remote control device 10 may continue to receive/display contents from the TV 31 until receiving another input from the user.

In an embodiment of the present invention, a virtual image related to an actual image of the target device may be generated and the virtual image may be displayed together with the actual image. This embodiment may be implemented when the remote control device 10 is in a control mode.

Figure 6:
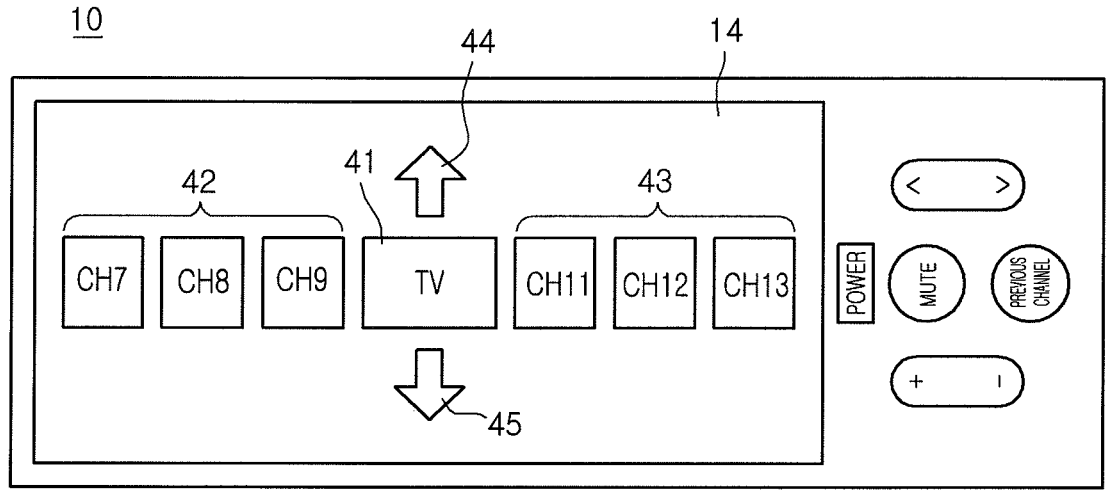

FIG. 6 illustrates a target device control method of the remote control device according to another embodiment of the present invention.

It is assumed that the remote control device 10 is oriented toward the TV 31. In this case, the camera 12 captures an image of the TV 31 and the TV image is displayed on the display unit 14 of the remote control device 10.

In this state, when the user inputs a predetermined command (e.g., a channel information view command), information of other channels than the channel tuned and displayed in the TV may be displayed horizontally around a TV image 41.

A virtual command may be inputted using a button installed at the outside of the remote control device 10. If the display unit 14 is a touchscreen, a virtual button for input of a user command may be displayed on the screen and a virtual command may be inputted using the virtual button.

In an embodiment of the present invention, channel information is a virtual image generated by the control unit 11. The channel information may be thumbnail images 42 and 43 of other channels than the current channel which are obtained by sequentially scanning a plurality of channels (i.e., a channel browsing operation). The channel browsing operation may be performed in a well-known way.

The channel browsing operation may be performed after a predetermined command is received from the user. In another embodiment, the channel browsing operation may be beforehand performed to store the channel information, and it may be displayed as illustrated in FIG. 6 after a predetermined command is received from the user.

In an embodiment, the horizontally-displayed channel information of the TV image 41 may be displayed in the order of channel numbers. For example, in FIG. 6, the channel information may be displayed such that the channel number decreases from the current channel toward the left (42) or the channel number decreases toward the right (43).

For example, if the current channel is CH10, the channel information of the left (42) may be displayed in the order of CH9, CH8, CH7, . . . and the channel information of the right (43) may be displayed in the order of CH11, CH12, CH13, . . . .

In an embodiment, the channel information may be displayed in the vertical direction (44, 45) of the TV image 41.

If the display unit 14 is a touchscreen, and when one of other channels 42 and 43 than the current channel is touched in the display state of FIG. 6, it may be changed into the channel.

In an embodiment of the present invention, after an image of a TV is captured, an actual image of the TV and information of an external device connected to the TV may be displayed as virtual images. This embodiment may also be implemented when the remote control device 10 is in a control mode.

Figure 7:
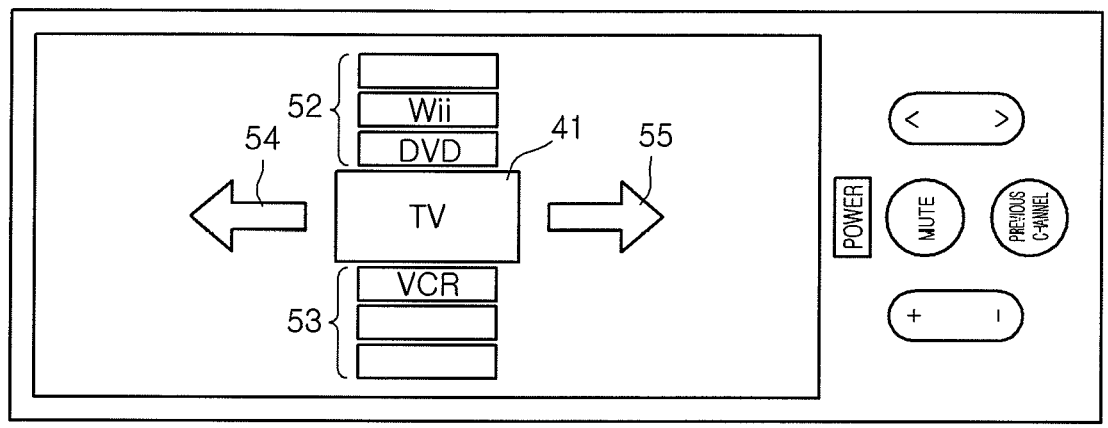

As illustrated in FIG. 3 or 4, when the remote control device 10 is oriented toward the TV 31, the control unit of the remote control device 10 may receive information of external devices 32 and 33, connected to the TV 31, from the TV 31 to display it as virtual images as illustrated in FIG. 7. Herein, images 52 and 53 of the external devices may be displayed vertically around the actual image 41 of the TV 31. According to this method, the user can intuitively detect whether certain external devices are connected to the TV 31.

In another embodiment, images 52 and 53 of the external devices may be displayed horizontally around the actual image 41 of the TV 31.

If the display unit 14 is a touchscreen, and when one of the external channels 52 and 53 is touched in the display state of FIG. 7, the output of the touched external device may be displayed on the TV 31.

In an embodiment, by combination of the embodiments of FIGS. 6 and 7, when the remote control device 10 is oriented toward the TV 31, a virtual image representing the channel information of the TV 31 may be displayed at the left and right of the TV image 41 and the information of the external devices connected to the TV 31 may be displayed at the top and bottom thereof. The top/bottom/left/right of the TV image 41 is merely exemplary, and the images of the external devices or the channel information may be displayed around the actual image 41 of the TV.

A remote control device according to an embodiment of the present invention remotely controls an electronic device (e.g., a target device such as TV 31) that outputs and provides contents to a user. The remote control device may include: a camera unit 12 capturing an image of an external device connected to the external device; a communication unit 13 receiving information of contents provided by the external device and transmitting a control signal to the target device or the external device; a display unit 14 displaying a captured actual image of the external device and a virtual image of the contents information; and a control unit 11 generating the virtual image on the basis of the received contents information and performing a control operation to a synthesized image of the actual image and the virtual image.

In an embodiment of the present invention, the remote control device 10 may use the camera unit 12 to photograph not only a target device (e.g., TV 31) but also an external device connected to the target device.

Hereinafter, an operation of the remote control device 10 according to an embodiment of the present invention will be described with reference to FIGS. 8 to 13.

Figure 8A:
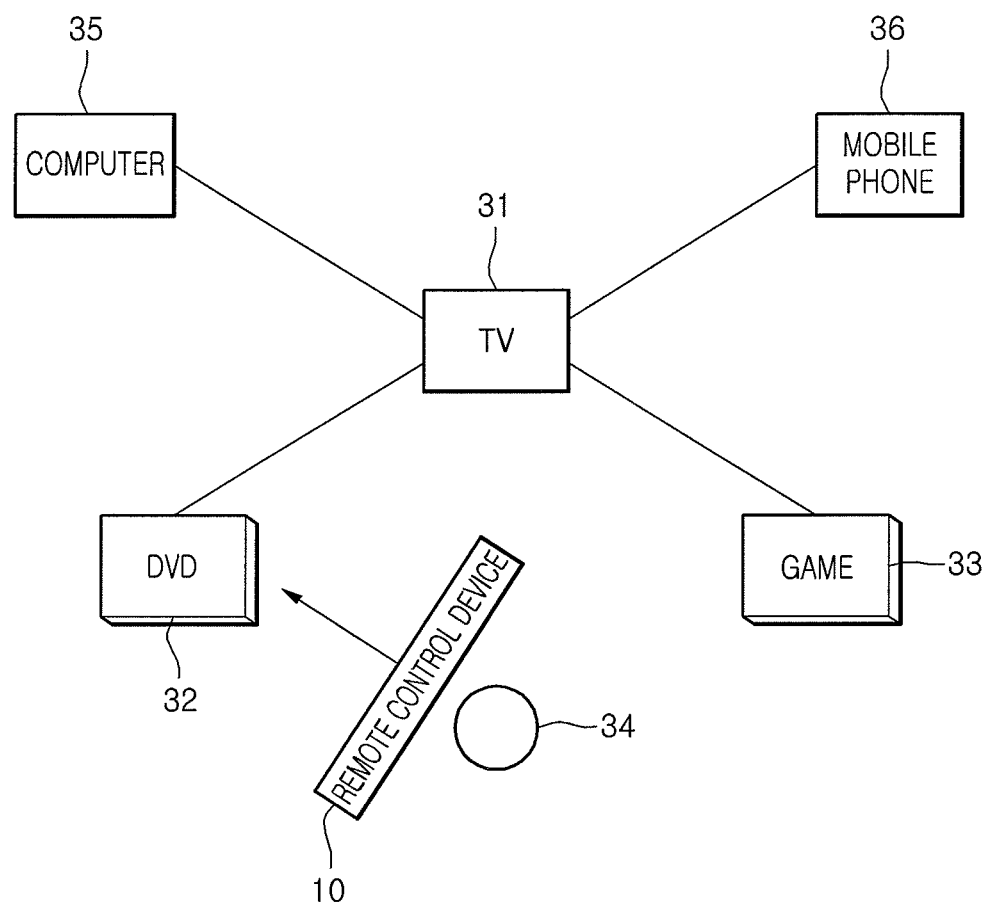
FIGS. 8 to 13 are diagrams illustrating the operations of a remote control device in accordance with an embodiment of the present invention.

As illustrated in FIG. 8A, the TV 31 may be connected in a wired or wireless manner to at least one external device to receive contents from the external device. For example, the TV 31 may be connected in a wired or wireless manner to external devices such as a DVD player 32, a computer 35, a mobile terminal 36 and a game 33 to receive contents from the external device.

As illustrated in FIG. 8A, a user 34 may orient the remote control device 10 toward the external device (e.g., the DVD player 32) connected to the TV 31. In this case, the camera unit 12 of the remote control device 10 captures an image of the DVD player 32.

An image of the DVD player 32 captured by the camera unit 12 is transmitted to the control unit 11 to constitute a portion of the image displayed on the display unit 14.

The communication unit 13 receives contents provided by the external device (e.g., the DVD player 32) and transmits a control signal to the target device or the external device.

In an embodiment of the present invention, the communication unit 13 may receive the contents information from the external device toward with the camera unit 12 is oriented.

For example, as illustrated in FIG. 8A, the communication unit 13 receives contents information from the external device (i.e., DVD player 32) toward with the camera unit 12 is oriented.

In an embodiment, the communication unit 13 may directly receive contents information from the external device (i.e., DVD player 32). In another embodiment, the communication unit 13 may indirectly receive contents information of the external device through the target device (e.g., the TV 31) connected to the external device.

In an embodiment, if the communication unit 13 receives contents information of the external device through direct communication, the communication unit 13 may transmit a contents information request signal in the orientation direction of the camera unit 12. Upon receiving the contents information request signal, the external device (i.e., the DVD player 32 in FIG. 8A) may transmit its contents information to the communication unit 13. The communication unit 13 may receive the contents information and transmit the same to the control unit 11.

In an embodiment, if the communication unit 13 indirectly receives contents information of an external device, i.e., if the communication unit 13 receives contents information through a target device connected to an external device, the control unit 11 may identify the external device through an image of the external device captured by the camera unit 12.

For example, as illustrated in FIG. 8A, if the camera unit 12 captures an image of the DVD player 32, the control unit 11 may analyze the image of the DVD player 32, captured by the camera unit 12, to identify the DVD player 32 as the external device photographed by the camera unit 12.

Thereafter, the communication unit 13 may transmit a contents information request signal for contents information of the DVD player 32 to the TV 31. In response to the contents information request signal, the TV 31 may retrieve contents information from the DVD player 32 and transmit the contents information to the remote control device 10.

In result, the communication unit 13 can receive contents information of the DVD player 32 even without communicating directly with the DVD player 32.

The control unit 11 generates a virtual image on the basis of the received contents information. Thereafter, the control unit 11 may synthesize the generated virtual image and the captured actual image of the external device and control the display unit 14 to display the synthesized image.

Figure 8B:
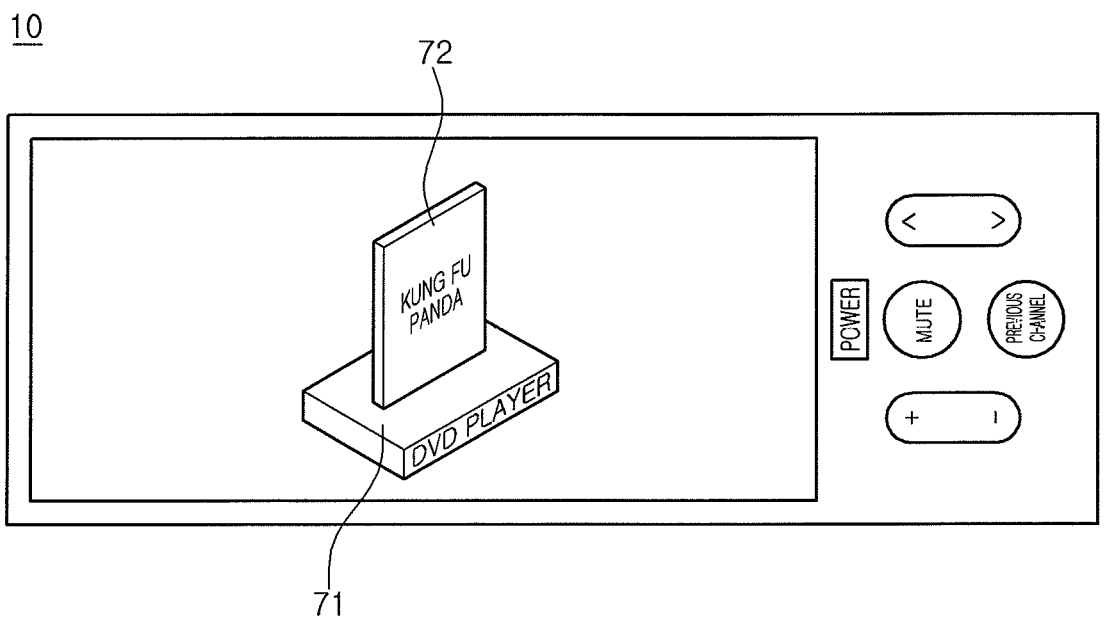

For example, as illustrated in FIG. 8B, the control unit 11 generates a virtual image 72 of the contents on the basis of the contents information of the DVD player 32. Referring to FIG. 8B, a DVD title 'KUNG FU PANDA' is inserted into the DVD player 32, and the control unit 11 generates a virtual image 72 of the contents on the basis of the contents information of the DVD title 'KUNG FU PANDA' provided by the DVD player 32.

Thereafter, the control unit 11 synthesizes the generated virtual image 72 and the captured actual image 71 of the external device (i.e., the DVD player 32) and controls the display unit 14 to display the synthesized image.

The image of the DVD player 32 illustrated in FIG. 8B is an actual image of the DVD player 32 captured by the camera unit 12. The remote control device 10 synthesizes the actual image 71 of the external device and the virtual image 72 of the contents provided by the external device and provides the synthesized image to the user, thereby providing a more convenient and intuitive interface to the user.

Herein, if the user orients the remote control device toward another external device connected to the TV 31, the remote control device 10 displays a synthesized image of an actual image of the external device and a virtual image of the contents provided by the external device.

Figure 9A:
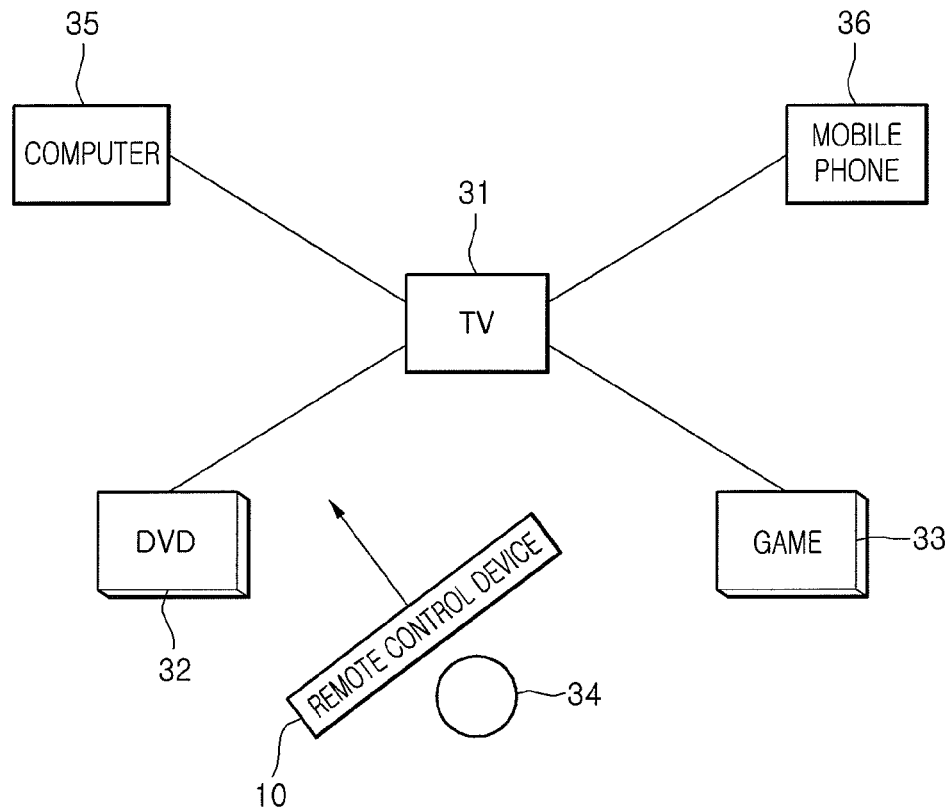
Figure 9B:
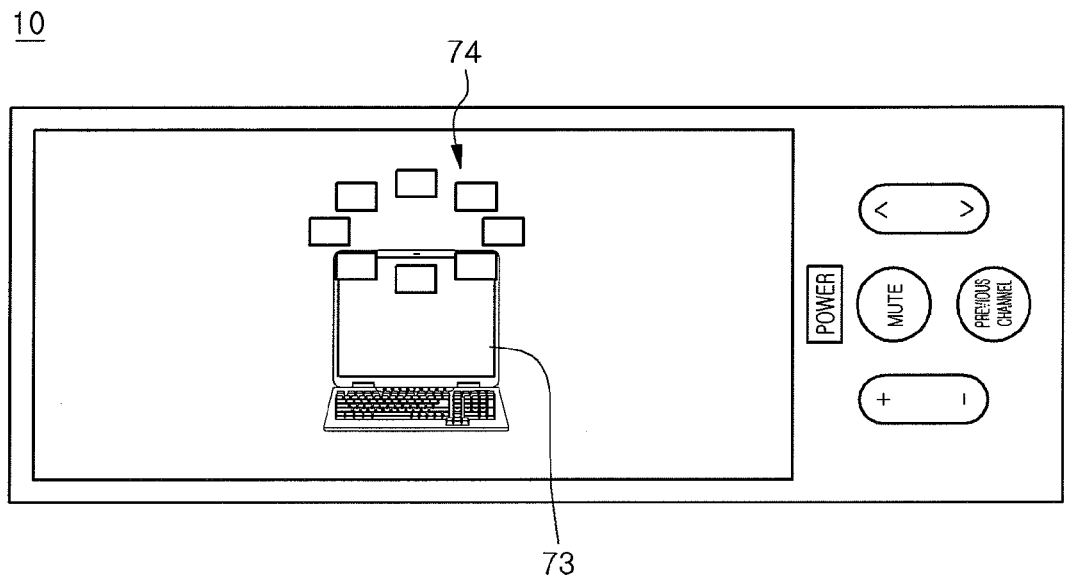

For example, as illustrated in FIG. 9A, if the user 34 orients the remote control device 10 toward the computer 35, the remote control device 10 synthesizes/displays an actual image 73 of the computer and a virtual image 74 of the contents provided by the computer, as illustrated in FIG. 9B.

In the embodiments of FIGS. 9A and 9B, like the embodiments of FIGS. 8A and 8B, the camera unit 12 generates an actual image by photographs an external device (i.e., a computer 35) connected to the target device 31. The communication unit 13 receives contents information from the computer 35 directly or indirectly. The control unit 11 generates a virtual image on the basis of the received contents information, synthesizes the actual image of the computer 35 and the virtual image of the contents and controls the display unit 14 to display the synthesized image.

In an embodiment of the present invention, the contents information may be information about contents that are stored in the external device or are inserted into the external device in the form of a recording medium.

For example, as illustrated in FIG. 8, the contents information may be information about contents recorded in a CD or a DVD inserted into the DVD player 32 or the game 33, or may be information about contents stored in the computer 35 or the mobile terminal 36.

In an embodiment, the contents information may include Title of contents provided by the external device, Genre, Play Time, Rating Level, Representative Image, and Snapshot of Main Scene. The virtual image of the contents provided by the remote control device 10 may include various contents information as above.

For example, FIG. 8B illustrates that the virtual image 72 includes only a contents title. However, in another embodiment, the virtual image 72 may further include Representative Image of contents, Snapshot of Main Scene, Genre, Play Time, and Rating Level.

In an embodiment of the present invention, if the external device provides a plurality of contents, the remote control device 10 may further provide a virtual image of the contents.

For example, as illustrated in FIG. 9B, if the computer 35 stores a plurality of contents in a memory, the communication unit 13 receives contents information of each of the contents from the computer 35. The control unit 11 generates a virtual image of each of the contents on the basis of the received contents information.

Thereafter, the control unit 11 performs a control operation to synthesize/display the virtual image of the contents and the actual image of the computer 35.

In an embodiment of the present invention, the remote control device 10 further includes a user input unit to receive a user input for browsing the displayed virtual images of the contents.

In an embodiment the user input unit is a touchscreen. In this case, as illustrated in FIG. 9C, the user may input a user input for browsing the virtual images of the contents through the touchscreen.

Figure 9C:
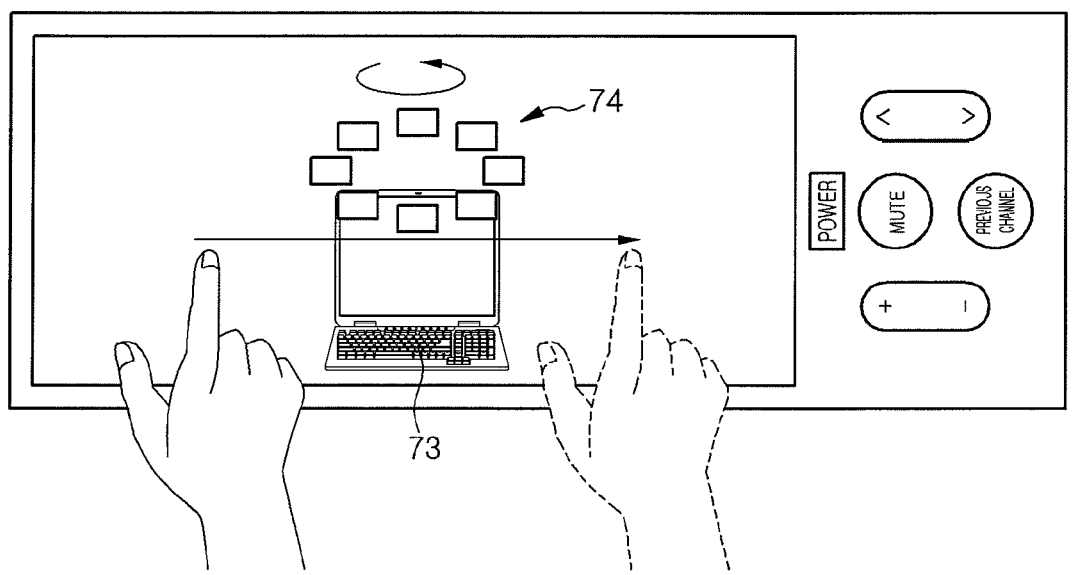

Referring to FIG. 9C, the user inputs a user input for dragging in a predetermined direction on the touchscreen. In this case, the remote control device 10 detects a drag input of the user through the touchscreen and rotates or moves the virtual image 74 of the contents in response to the detected drag input, thereby making it possible to browse the contents. Operations other than drag operations (e.g., tilt, rotate, multi-touch, etc.) may be used instead of or with the above-described drag operations. For example, a user may tilt the remote control 10 up/down or left/right to browse. The degree of tilt and/or the speed of tilt may control the speed of browsing. A rapid double tilt or other gesture may be used to jump a predetermined distance or to an end of a display.

In an embodiment, the remote control device 10 synthesizes/displays the actual images of external devices and the virtual images of the contents provided by the external devices.

Figure 10:
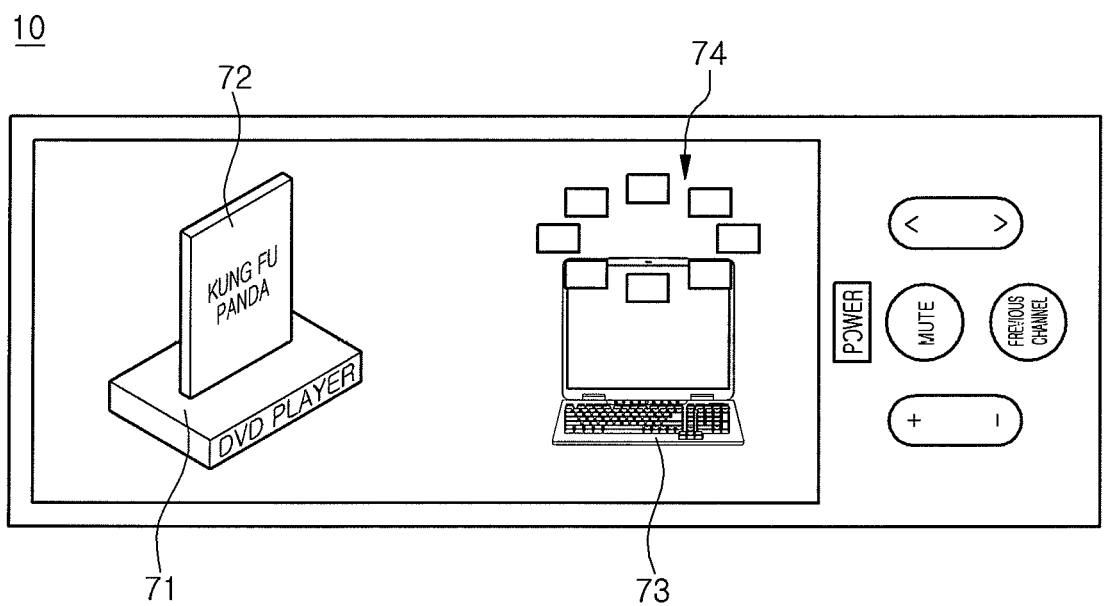

For example, as illustrated in FIG. 10, the camera unit 12 of the remote control device 10 may capture a plurality of external devices (e.g., a DVD player 32 and a computer 35) together.

In this case, the communication unit 13 receives contents information from the photographed external devices. The control unit 11 generates a virtual image on the basis of the received contents information, synthesizes the generated actual image and the virtual image of the external devices and controls the display unit 14 to display the synthesized image.

In an embodiment of the present invention, the user input unit may receive a user input for selecting the displayed virtual image.

In an embodiment, the user input unit may be a touchscreen and the user input may be a touch input for the virtual image displayed on the touchscreen.

Figure 11A:
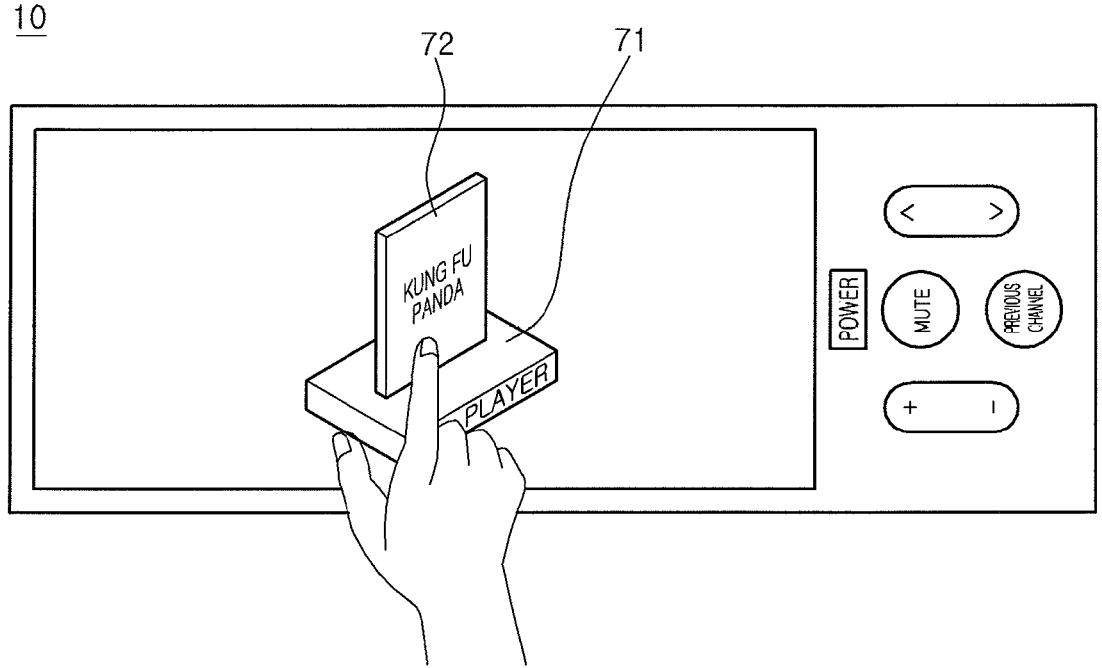

For example, as illustrated in FIG. 11A, an actual image 71 of a DVD player 32 and a virtual image of a 'KUNG FU PANDA' DVD tile provided by the DVD player 32 are displayed on a touchscreen in a synthesized manner. If the user touches the virtual image 72, the touchscreen detects a touch input for the virtual image 72. In response to the touch input, the control unit 11 generates a selection signal for selecting the virtual image 72.

In an embodiment, the user input unit may be a keybutton and the user input may be an input of pressing the keybutton while the virtual image is displayed on the display unit 14.

Figure 11B:
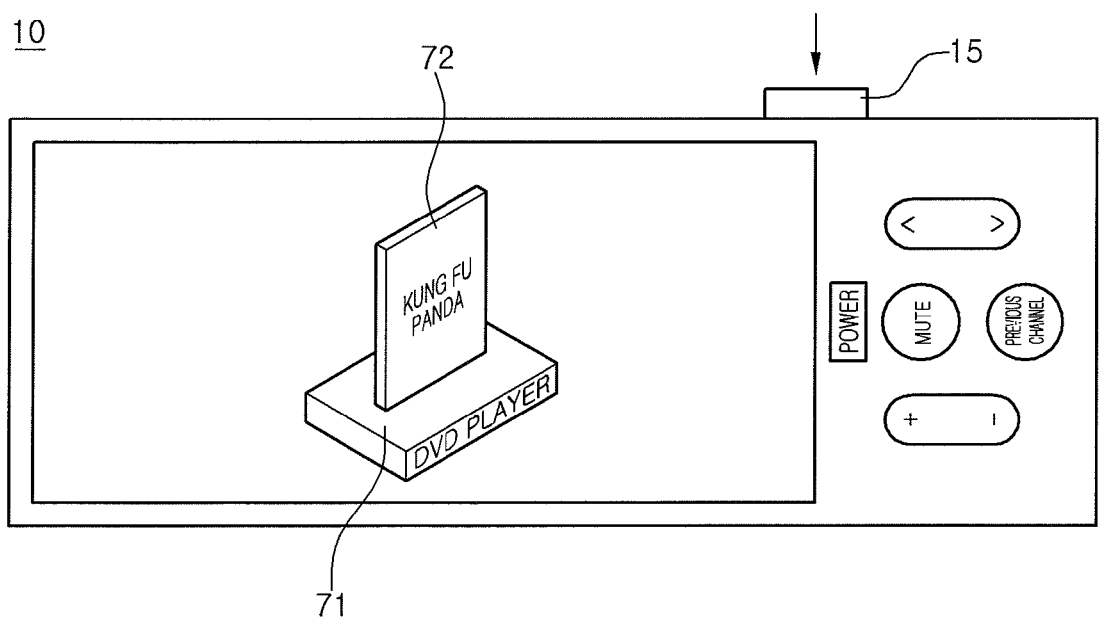

For example, as illustrated in FIG. 11B, if a keybutton 15 is pressed while the display unit 14 is displaying an actual image 71 of a DVD player 32 and a virtual image 72 of a 'KUNG FU PANDA' DVD title provided the DVD player 32, the control unit 11 may generate a selection signal for selecting the displayed virtual image 72.

In an embodiment, the virtual image 72 may be automatically selected without the use of a separate user input when it satisfies a predetermined condition.

For example, if the virtual image 72 is displayed on the display unit 14 for a predetermined time, the control unit 11 may generate a signal for selecting the displayed virtual image 72. In this case, the user may select the contents of the external device solely by photographing the external device without inputting a separate touch input or a separate keybutton input.

In an embodiment of the present invention, when the camera unit 12 captures an image of the target device after the selection of the virtual image 72, the control unit 11 may generate a control signal for controlling the contents, corresponding to the selected virtual image 72, to be provided to the target device.

Figure 12A:
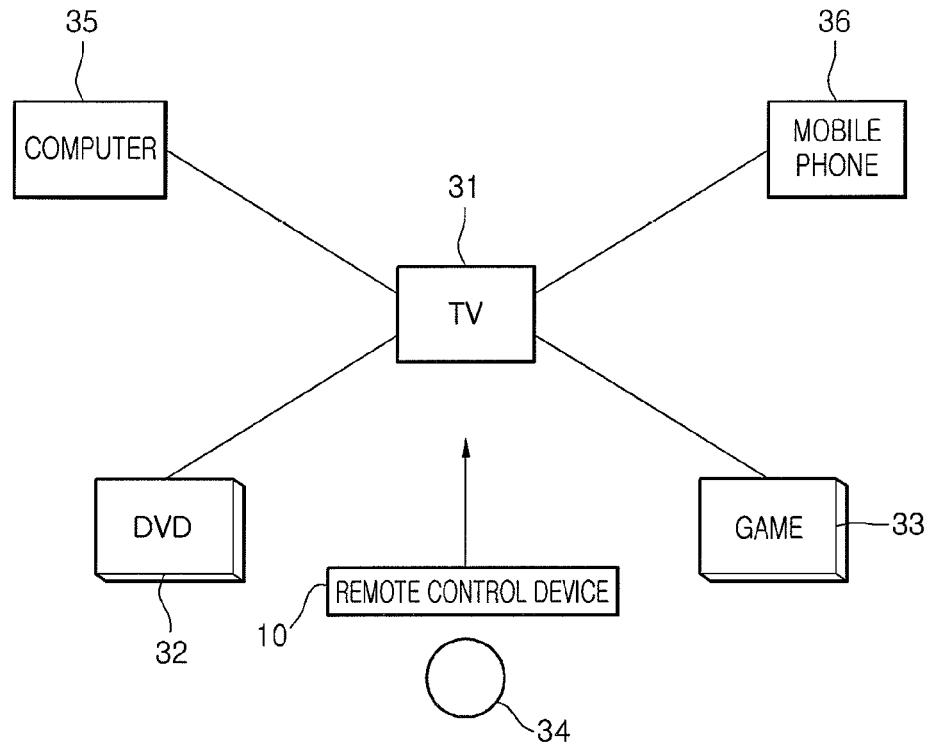

For example, as illustrated in FIG. 12A, the user may orient the remote control device 10 toward a target device (i.e., a TV 31) after the selection of the virtual image 72.

In this case, the camera unit 12 captures an image of the TV 31, and the control unit 11 perform a control operation to provide the contents corresponding to the selected virtual image 72 to the TV 31.

Figure 12B:
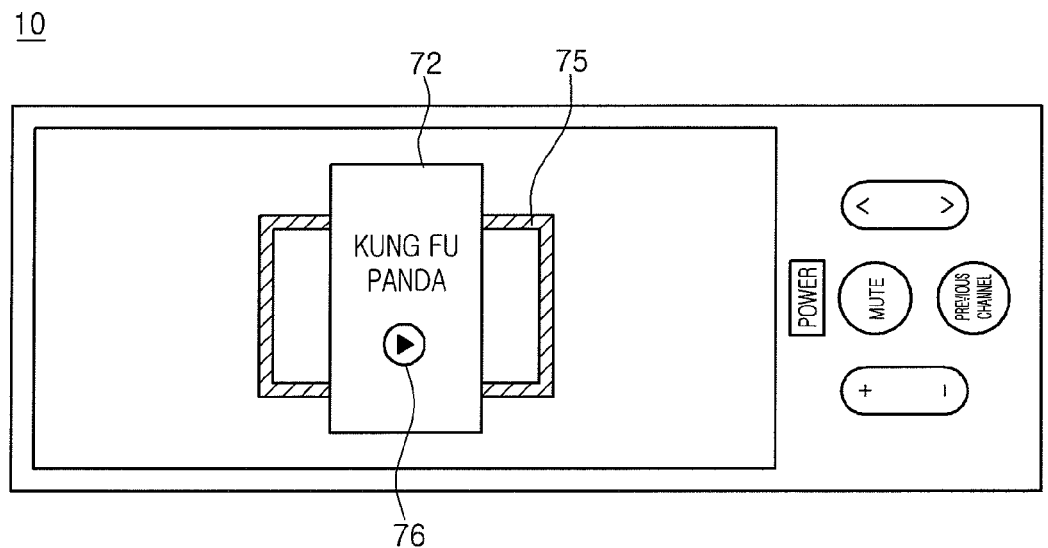

For example, as illustrated in FIG. 12B, the camera unit 12 photographs a TV 31 and the display unit 14 displays an actual image 75 of the TV 31. If the virtual image 72 of the selected 'KUNG FU PANDA' DVD title overlaps with the actual image 74 of the TV 31, a play button 76 may be displayed at the virtual image 72.

Figure 12C:
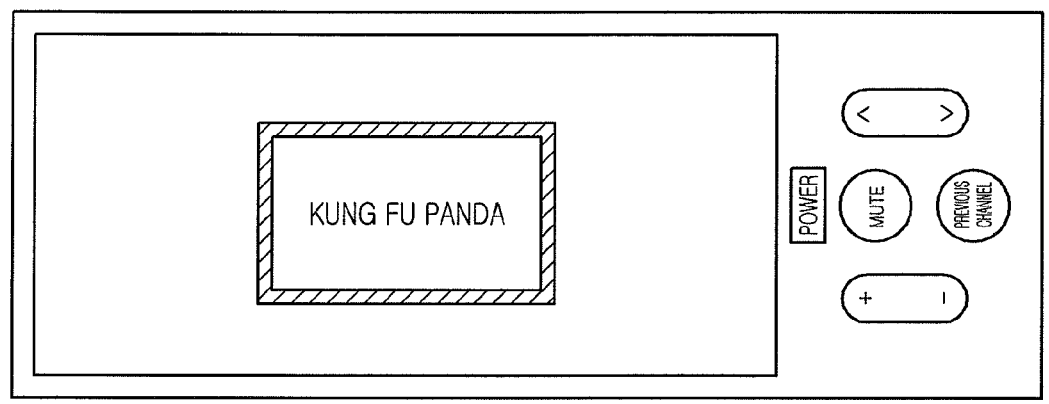

Thereafter, if the user touches the displayed play button 76 or presses a confirmation button, the 'KUNG FU PANDA' DVD title inserted in the DVD player 32 is provided to the TV 31, so that the 'KUNG FU PANDA' DVD title can be displayed through the TV 31 as illustrated in FIG. 12C.

Likewise, after a virtual image of contents is selected among the virtual images 74 of the contents illustrated in FIG. 9B, the remote control device 10 is oriented toward to the TV 31 so that the camera unit 12 photographs the TV 31. Then, the control unit 11 generates a control signal for controlling the contents, corresponding to the selected virtual image, to be transmitted from the computer 35 to the TV 31. The control signal may be transmitted through the communication unit 13 to the computer 35 or the TV 31.

In result, the contents corresponding to the selected virtual image are transmitted from the computer 35 to the TV 31 and the contents are executed in the TV 31.

In an embodiment, the selected contents may be stored in a memory of the target device instead of being executed in the target device.

In this case, the remote control device 10 may further provide a storage button (in addition to a play button for playing the selected virtual image 72) to receive a user input for selecting one of the two buttons.

Figure 12D:
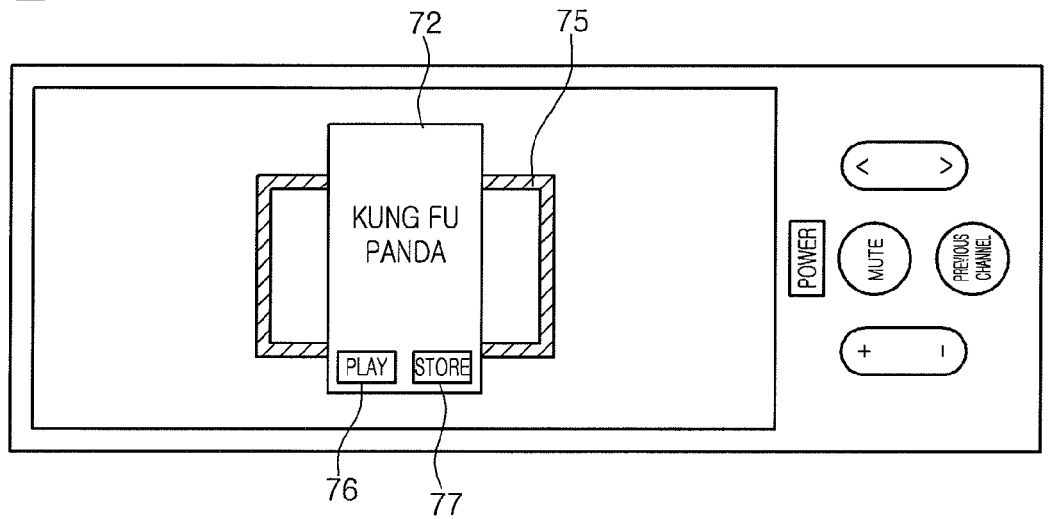

For example, as illustrated in FIG. 12D, after the selection of the virtual image 72, the camera unit 12 photographs the TV 31. If the virtual image 72 overlaps with the actual image 75 of the TV 31, the display unit 14 may provide both a play button 76 for playing the contents corresponding to the virtual image 72 in the TV 31 and a storage button 77 for storing the contents in the TV 31.

Figure 12E:
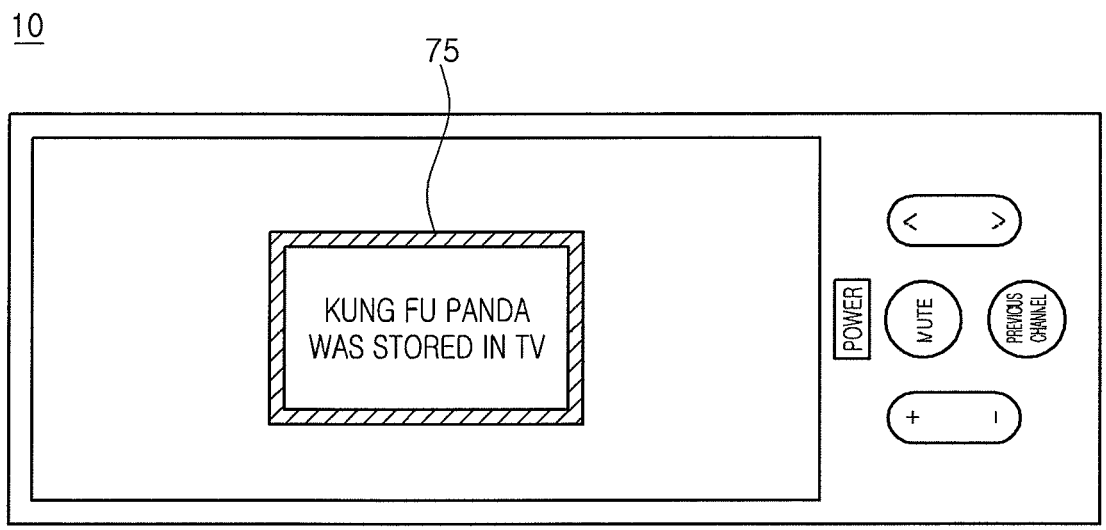

Thereafter, if the user inputs a user input for selection of the storage button 77, the control unit 11 generates a control signal for transmitting and storing the contents corresponding to the selected virtual image 72 (i.e., the 'KUNG FU PANDA' title) in the TV 31 and transmits the control signal through the communication unit 13 to the DVD player 32 or the TV 31, so that the 'KUNG FU PANDA' title can be stored in a memory of the TV 31 as illustrated in FIG. 12E.

In an embodiment of the present invention, the user input unit may receive a user input for continuously displaying an actual image of the external device and a virtual image of the contents. In response to the user input, the control unit 11 may control the actual image and the virtual image to be displayed continuously regardless of the orientation direction of the camera unit 12.

Figure 13:
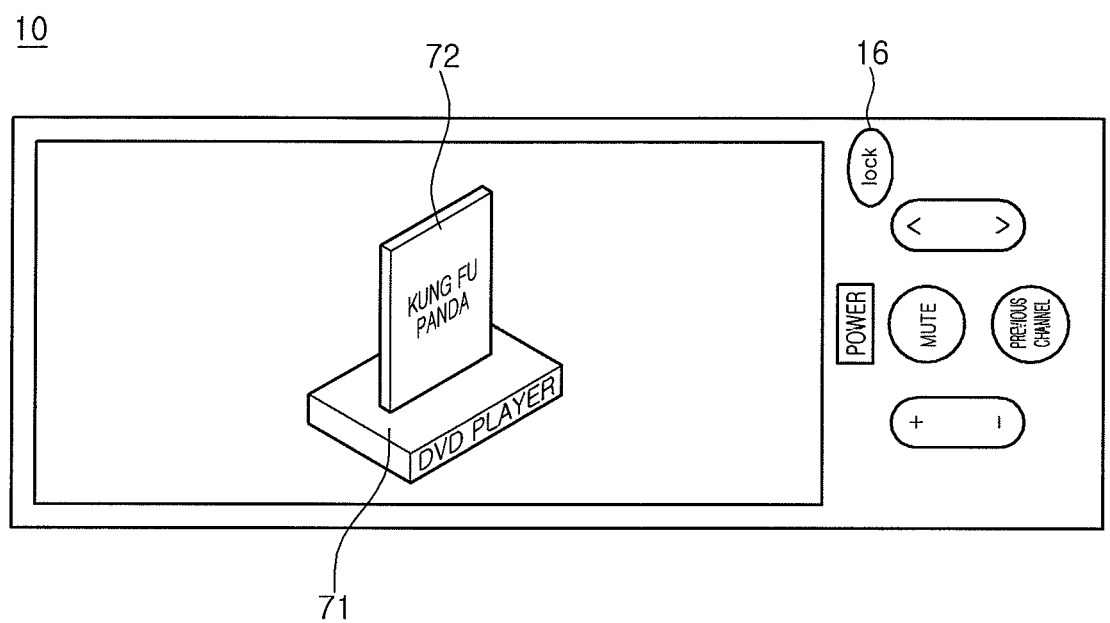

For example, as illustrated in FIG. 13, the remote control device 10 has a lock button 16 at its outside and may receive a user input from the user to continuously display an actual image of the external device and a virtual image of the contents.

For example, as illustrated in FIG. 13, if the camera unit 12 photographs the DVD player 32, the control unit 11 performs a control operation to display a synthesized image of an actual image 71 of the DVD player 32 and a virtual image 72 of the contents provided by the DVD player 32. If the user presses the lock button 16, the control unit may control the actual image and the virtual image 72 to be displayed continuously regardless of the orientation direction of the camera unit 12.

In result, even when the user presses the lock button and orients the remote control device 10 in a certain direction, the remote control device 10 can continuously display the virtual image and the actual image that were displayed at the press of the lock button 16.

Figure 14:
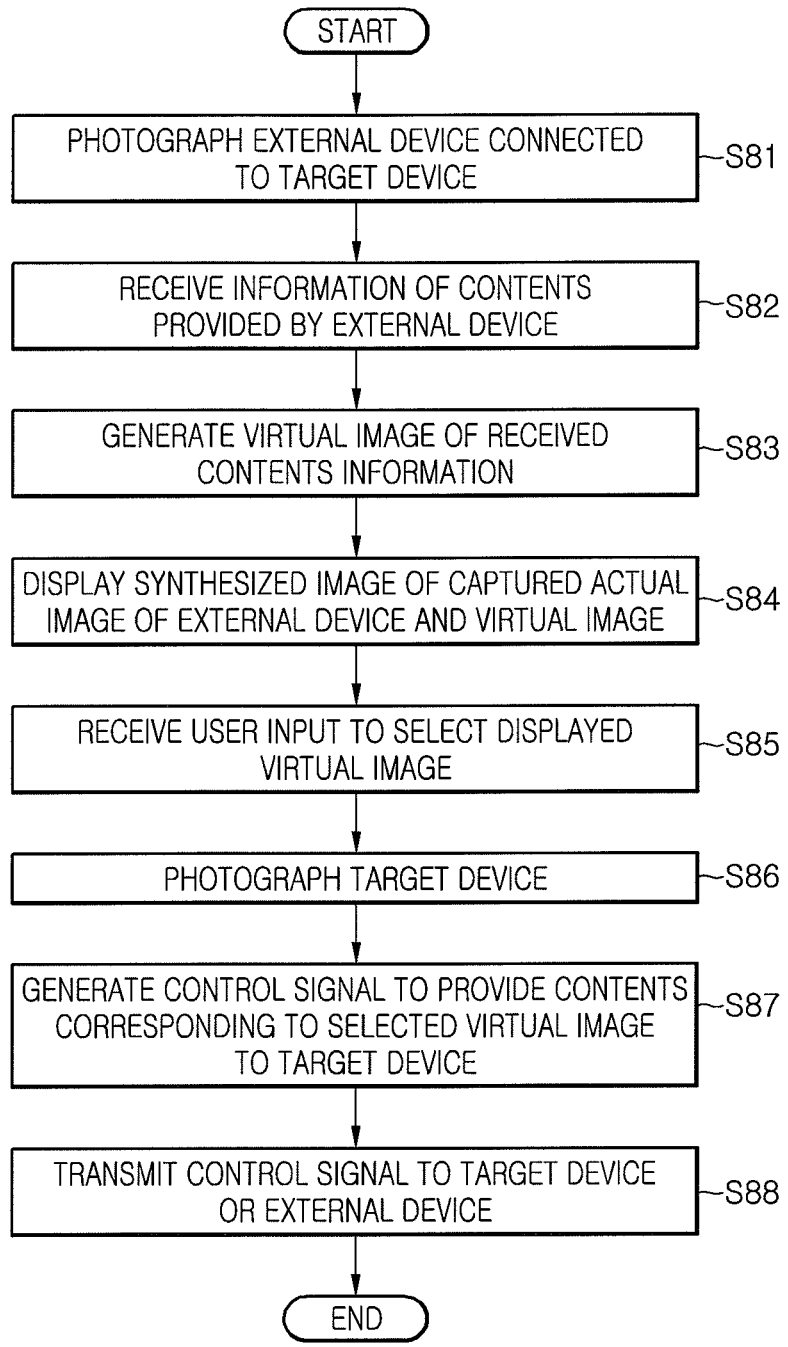
FIG. 14 is a flow diagram illustrating a remote control method in accordance with an embodiment of the present invention.

FIG. 14 is a flow diagram illustrating a remote control method in accordance with an embodiment of the present invention.

Referring to FIG. 14, a step S81 photographs an external device connected to a target device. Herein, the target device may be an electronic device (e.g., a TV or a display device) that can display contents to provide the same to the user. For example, the camera unit 12 of the remote control device 10 of the present invention photographs the external device to provide an actual image.

A step S82 receives contents information provided by the external device. In an embodiment, the contents information may be received from the external device toward with the camera unit 12 is oriented.

A step S83 generates a virtual image of the received contents information. For example, if information about contents (e.g., a 'KUNG FU PANDA' title) providable by the DVD player 32 is received, a virtual image of the contents may be generated on the basis of the received contents information.

A step S84 displays a synthesized image of the virtual image and the captured actual image of the external device. For example, the remote control method of the present invention may control the display unit to display a synthesized image of the captured actual image of the external device and the virtual image of the contents generated on the basis of the received contents information.

A step S85 receives a user input for selecting the displayed virtual image. In an embodiment, the user input may be received by detecting a touch input for touching a virtual image displayed on a touchscreen.

In an embodiment, the user input may be inputted by receiving an input of pressing a predetermined keybutton while a virtual image is being displayed.

In an embodiment, the virtual image may be automatically selected when it is displayed on the display unit for a predetermined time.

A step S86 photographs a target device. For example, after the virtual image is selected, the remote control device 10 is oriented in a different direction to a target device (e.g., a TV 31).

A step S87 generates a control signal for providing the contents, corresponding to the selected virtual image, to the target device. For example, if the TV 31 is photographed and the selected virtual image overlaps with the actual image of the TV 31, a control signal may be generated to transmit/execute the contents corresponding to the virtual image to/in the TV 31.

In an embodiment, one of a play command for executing the contents in the TV 31 and a storage command for storing the contents in the TV 31 is inputted from the user, and the contents may be executed or stored in the TV 31 in response to the input.

A step S88 transmits the generated control signal to the target device or the external device to execute or store the contents.

In an embodiment of the present invention, the remote control device 10 may be used to control the target device to which the remote control device 10 is oriented. For example, this embodiment may be implemented when the remote control device 10 is in a control mode.

Figure 15:
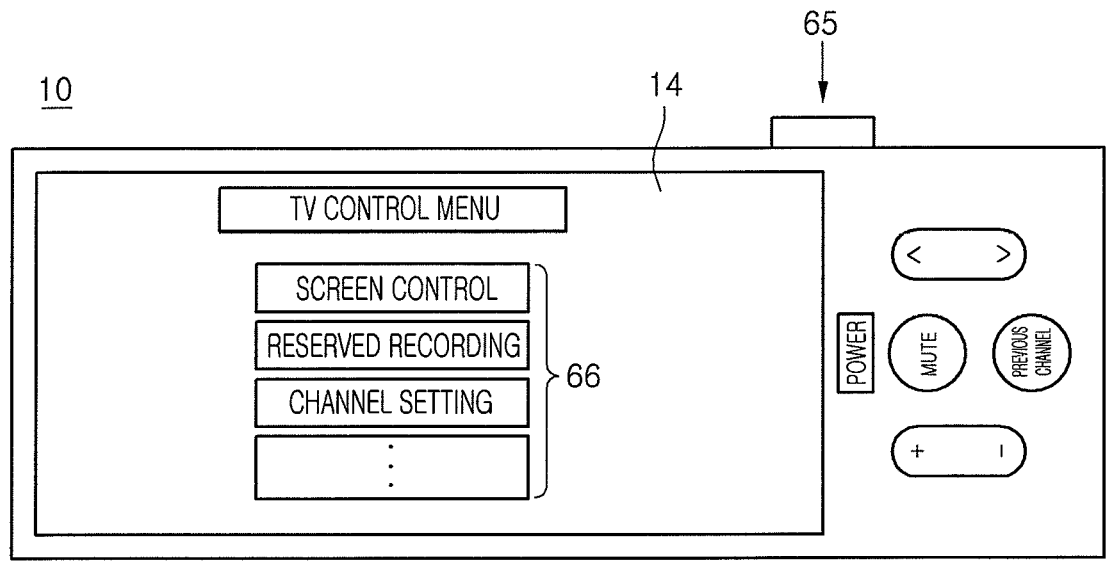
FIG. 15 is a diagram illustrating a target device control method in accordance with an embodiment of the present invention.

It is assumed that the remote control device 10 is oriented toward the TV 31 as illustrated in FIG. 3 or 4. For example, it is assumed that the camera unit 12 of the remote control device 10 is oriented toward the TV 31. When the remote control device 10 is oriented toward the TV 31 and if the user presses a button 65 at one side of the remote control device 10, a menu 66 may be displayed on the display unit 14 of the remote control device 10 to control the TV 31, as illustrated in FIG. 15.

The control menu of the TV 31 may include Screen Control, Reserved Recording, Volume Control, and Time Control.

The above operation may be similarity performed on other external devices 32 and 33, as well as on the TV 31.

The user may dispose the button 65 at a typical camera photograph button position of the remote control device 10. The menu of the photographed target device may be displayed when the user presses the button 65 like the pressing of a camera photograph button while orienting the remote control device 10 like the photographing of the target device by the camera.

During the display of the menu 66, the user may touch the display unit to select the menu and to control the menu of the TV 31.

In an embodiment of the present invention, when the positions of the target devices are inputted into the remote control device 10, the target devices can be controlled even without orienting the camera of the remote control device 10 toward the target devices. In this case, the remote control device 10 is equipped with a motion sensor.

Figure 16:
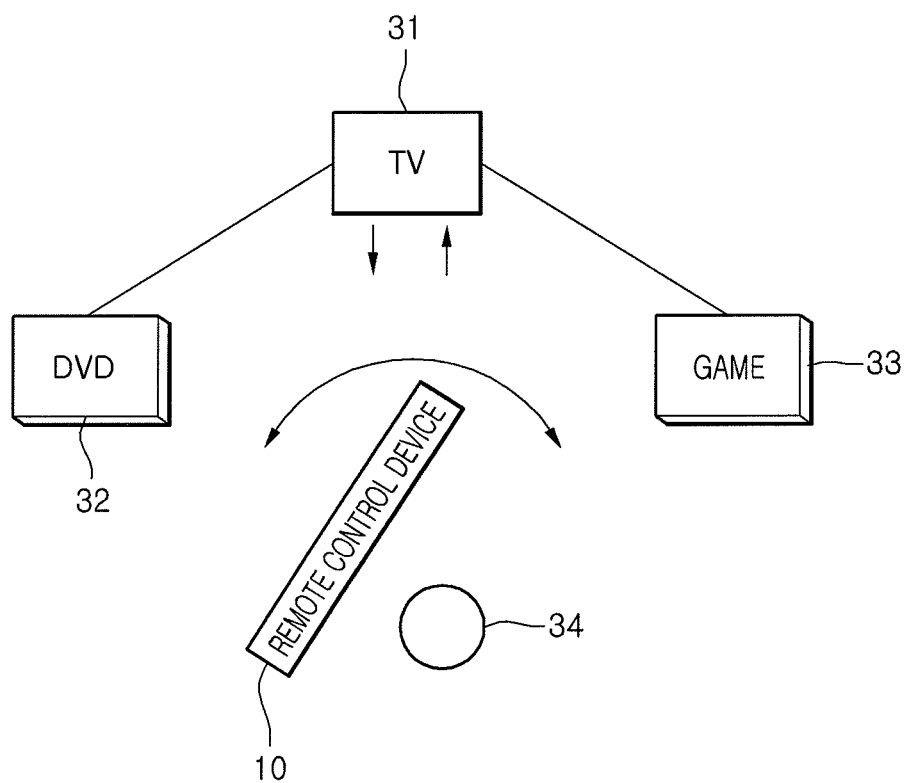
FIG. 16 is a diagram illustrating a method for controlling a target device without directing a remote control device toward the target device, in accordance with an embodiment of the present invention.

As illustrated in FIG. 16, a user 34 controls the camera of the remote control device 10 to scan the target devices, i.e., the external devices 32 and 33. The relative positions and images of the scanned target devices are stored in a memory installed in the remote control device 10. The remote control device 10 may display the images and positions on the display unit.

In this state, when the user moves the remote control device 10 horizontally, the motion sensor in the remote control device 10 detects the motion to display it on the display unit of the remote control device 10.

That is, even when the remote control device 10 is not oriented toward a desired target device, the motion applied to the remote control device 10 by the user may be detected using the motion sensor and the displayed target device may be changed according to the detected motion. The same operations as the above-described embodiment may be implemented according to the displayed target device.

Once the remote control device 10 photographs the target devices to store the relative positions and images of the target devices, and even when the remote control device 10 is not oriented toward the target device or even when the camera unit of the remote control device 10 is disabled, this embodiment can implement the operations of various embodiments described above.

According to this embodiment, the user need not orient the remote control device 10 toward a desired target device in order to control the target devices. The remote control device 10 has only to be within the range for wireless communication with the desired target devices.

For example, a user may decide to browse plural digital audio files remote control device 10. The user may lie down with the remote control device 10 pointed to the ceiling and browse an audio data storage within range by scrolling through images and/or audio clips with various predefined gestures (e.g., tilt up for back browse, tilt down for forward browse.)

The remote control device 10 according to the present invention may be any electronic device that is equipped with a camera, a display, a short-range communication module and suitable software. For example, if a mobile terminal such as a mobile phone is equipped with suitable software, it may be used as the remote control device 10. In particular, a recent-launched touchscreen phone is suitable for use as the remote control device 10.

In the previously described embodiments, an actual and a synthesized image were described. In some embodiments, the synthesized image may be a 3-dimensional (3-D) image. Alternatively, the synthesized image may be a digital image stored by the user or stored by the manufacturer. For example, a user may create (e.g., photograph) or download an image and associate this image with the controlled device.

In the previously described embodiments related to television channel browsing, channel browsing through a main display was discussed. However, the remote control device 10 may also control channels or other inputs to a Picture-in-Picture (PIP) or other split screen display. The remote control unit may also be used to turn such secondary displays ON or OFF.

The previously described embodiments are not limited to interactions with individual devices at a time. For example, a user may use the remote control device 10 to interact with multiple devices in parallel or in series, such that files (e.g., movie files or audio files) from different devices are queued for playing. Alternatively, the remote control device 10 to interact with multiple devices in parallel or in series in a showroom such that a shopper or store employee may control multiple devices. When controlling multiple devices, control operations of remote control device 10 may be associated with individual components either via line-of-sight discrimination or via passwords or registration keys or other techniques that would prevent a user from inadvertently controlling device A when device B was the intended device. In the alternative, it is also possible for a user to use remote control device 10 to control multiple devices simultaneously.

When the target device is a home appliance such as washer, dryer, air conditioner, refrigerator and other kitchen appliance, the remote control device 10 may control ON/OFF operations, as well as operations specific to the device such as a time, temperature, a cycle, a mode, an alarm, etc.

When the target device is a computer or other personal information processing device, the remote control device 10 may control ON/OFF operations, as well as operations specific to the device such as a file search/retrieval, file opening/closing, scrolling, highlighting, cut-and-pasting, emailing, texting, etc. For example, by using one or more of the previously described capabilities, a user may use the remote control device 10 to turn on a computer, open a folder, peruse file names, and cause a selected file to be opened.

When the target device is a vending machine, a user may use remote control 10 to determine the contents, prices and amounts of items. For example, a user may interrogate a drink machine to determine how many items of different types are available. The user may select one item for dispensing, with payment made via information stored in a SIM card in the mobile terminal 100.

If the target device is an automobile, the remote control 10 may obtain diagnostic information of a personal vehicle, or sales or technical information from one or more automobiles at a showroom or other sales location.

In preceding embodiments, options for interactions with multiple devices via Bluetooth or related technologies were identified. In these, and perhaps other, scenarios, it is possible to take measures to avoid inadvertent or malicious equipment operations by a third party (e.g., a neighbor in a nearby apartment who may inadvertently control another's television.) It is possible to pre-register devices with specific remote controllers. It is also possible for a user to enable/disable the controllable devices for a predefined or undefined period of time. Also, various forms of encryption may be used to protect unwanted interactions. Alternatively, as in the previously described vending machine or device/automobile showroom embodiments, selected controllable devices may be set up for open access by any remote control device 10.

Figure 17:
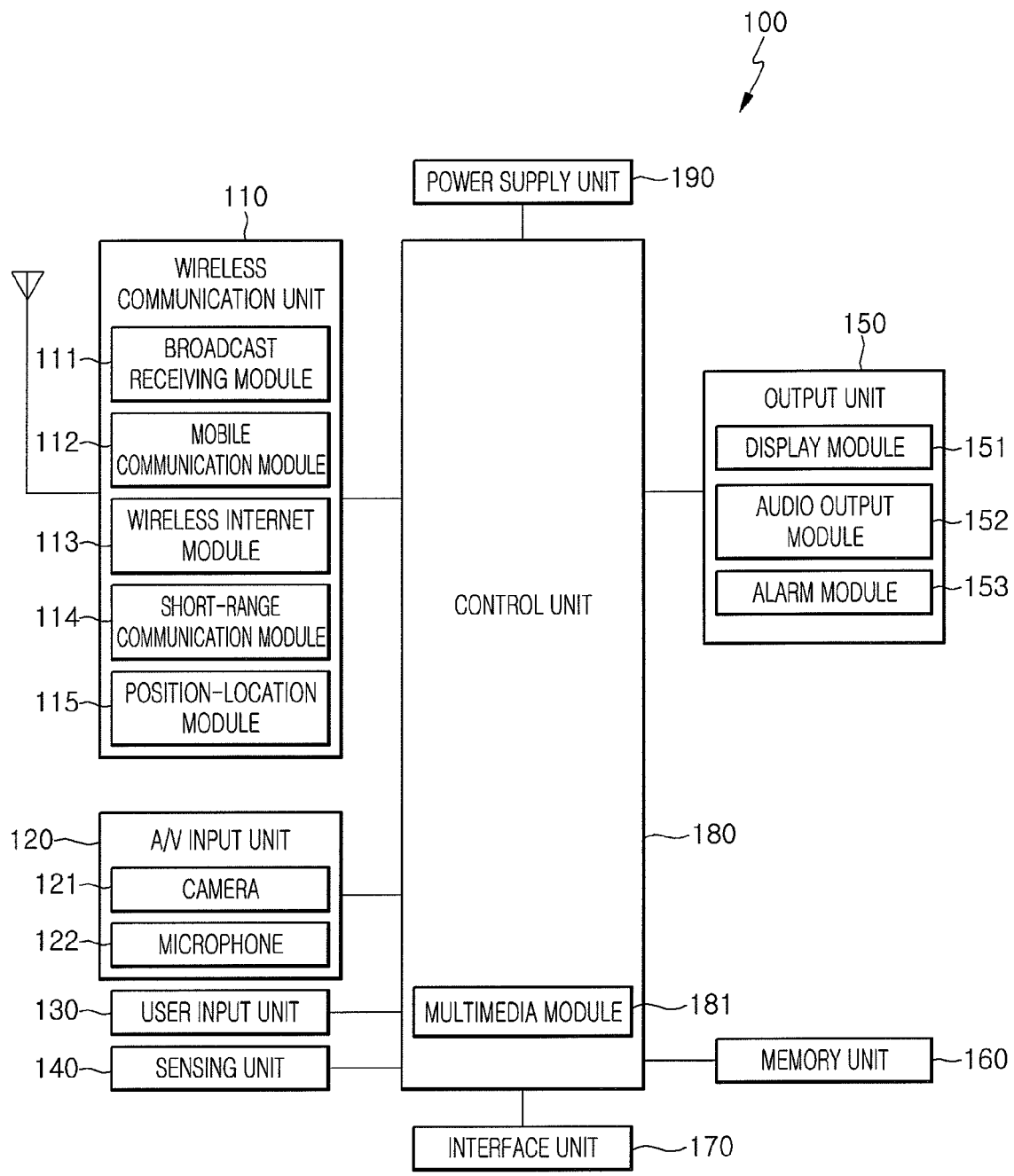
FIG. 17 is a block diagram of a mobile terminal usable as a remote control device in accordance with an embodiment of the present invention.

FIG. 17 is a block diagram of a mobile terminal 100 usable as a remote control device 10 in accordance with an embodiment of the preset invention. The mobile terminal 100 may be implemented using a variety of different types of terminals. Examples of the mobile terminal 100 include mobile phones, user equipments, smart phones, computers, MP3 players, Portable Multimedia Players (PMPs), digital broadcast terminals, notebook computers, and navigators.

Referring to FIG. 17, the mobile terminal 100 may include a wireless communication unit 110, an audio/video (A/V) input unit 120, a user input unit 130, a sensing unit 140, an output unit 150, a memory unit 160, an interface unit 170, a control unit 180, and a power supply unit 190.

By way of non-limiting example only, further description will be with regard to a mobile terminal. However, such teachings apply equally to other types of terminals. FIG. 17 illustrates the mobile terminal 100 having various components, but it is understood that implementing all of the illustrated components is not a requirement. Greater or fewer components may alternatively be implemented.

FIG. 17 illustrates a wireless communication unit 110 configured with several commonly implemented components. For instance, the wireless communication unit 110 typically includes one or more components which permits wireless communication between the mobile terminal 100 and a wireless communication system or network within which the mobile terminal is located. For example, the wireless communication unit 110 may include a broadcast receiving module 111, a mobile communication module 112, a wireless Internet module 113, a short-range communication module 114, and a position-location module 115.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, and a broadcast service provider. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module ill may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory unit 160.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal.

The short-range communication module 114 facilitates relatively short-range communications. The short-range communication module 114 may be used as the short-range communication module 13 of FIG. 1. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal. If desired, this module may be implemented using global positioning system (GPS) components which cooperate with associated satellites, network components, and combinations thereof.

The A/V input unit 120 is configured to provide audio or video signal input to the mobile terminal. The A/V input unit 120 may include a camera 121 and a microphone 122. The camera 121 receives and processes image frames of still pictures or video. The processed image frames may be displayed on the display module 151.

The image frames processed by the camera 121 may be stored in the memory unit 160 or may be transmitted through the wireless communication unit 110 to external devices. The mobile terminal 100 may include two or more cameras 121 according to embodiments. The camera 121 may be used as the camera 121 of FIG. 1.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory unit 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. The user input unit 130 may be a touchscreen configured by installing a touch panel in the display unit 14 of FIG. 1.

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply unit 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless headset port, an external charter port, a wired/wireless data port, a card socket (e.g., for coupling to a memory card, subscriber identity module (SIM) card, user identity module (UIM) card, removable user identity module (RUIM) card), audio input/output ports, and video input/output ports, and an earphone port.

The output unit 150 generally includes various components which support the output requirements of the mobile terminal. The output unit may include a display module 151, an audio output module 152, and an alarm unit 153.

The display module 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display module 151 may additionally or alternatively display images which are associated with these modes. The display module 151 may be the display unit 14 of FIG. 1.

One particular implementation includes the display module 151 configured as a touch screen working in cooperation with an input device, such as a touchpad. This configuration permits the display to function both as an output device and an input device. The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

The audio output module 152 supports the audio output requirements of the mobile terminal 100. The audio output module is often implemented using one or more speakers, buzzers, other audio producing devices, and combinations thereof. The audio output module 152 functions in various modes including call-receiving mode, call-placing mode, recording mode, voice recognition mode and broadcast reception mode. During operation, the audio output module 152 outputs audio relating to a particular function (e.g., call received, message received, and errors). The audio output module 152 may include a speaker and a buzzer.

The alarm module 153 is commonly used to signal or otherwise identify the occurrence of a particular event associated with the mobile terminal. Typical events include call received, message received and user input received. An example of such output includes the providing of tactile sensations (e.g., vibration) to a user. For instance, the alarm module 153 may be configured to vibrate responsive to the mobile terminal receiving a call or message. As another example, vibration is provided by alarm module 153 responsive to receiving user input at the mobile terminal, thus providing a tactile feedback mechanism. It is understood that the various output provided by the components of output unit 150 may be separately performed, or such output may be performed using any combination of such components.

The memory unit 160 is generally used to store various types of data to support the processing, control, and storage requirements of the mobile terminal. Examples of such data include program instructions for applications operating on the mobile terminal, contact data, phonebook data, messages, pictures, video, etc.

The memory unit 160 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device. Also, the mobile terminal 100 may operate a web storage to perform a storage function of the memory unit 150 on the Internet.

The control unit 180 typically controls the overall operations of the mobile terminal. For instance, the controller performs the control and processing associated with voice calls, data communications, video calls, camera operations and recording operations. If desired, the controller may include a multimedia module 181 which provides multimedia playback. The multimedia module 181 may be configured as part of the control unit 180, or this module may be implemented as a separate component. The control unit 180 may be the control unit 11 of FIG. 1.

The power supply unit 190 provides power required by the various components for the portable device. The provided power may be internal power, external power, or combinations thereof.

As described above, various embodiments of the present invention may be applicable to any mobile terminal 100 equipped with a camera. If the mobile terminal 100 is a smart phone, it may be implemented using an application capable of executing the above operations. When an application for implementation of a remote control device is installed and executed in a smart phone, the operations of the above-described various embodiments can be performed. The various embodiments of the present invention may be advantageous to a smart phone equipped with a touchscreen.

The buttons 21, 24, 23, 22 and 25 on the remote control device 10 may be configured to match with hard buttons on a smart phone. In the case of a smart phone equipped with a touch screen, it may be configured to display the matching buttons on the touchscreen.

According to the above-described configuration, a smart phone user may install a smart phone application in the smart phone for use as a remote control device.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments are implemented by control unit 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory unit 160), and executed by a controller or processor (for example, control unit 180).

Although the present invention have been described with reference to a number of illustrative embodiments thereof, it should be understood that numerous other modifications and embodiments can be devised by those skilled in the art that will fall within the spirit and scope of the principles of the present invention. More particularly, various variations and modifications are possible in the component parts and/or arrangements of the subject combination arrangement within the scope of the invention, the drawings and the appended claims. In addition to variations and modifications in the component parts and/or arrangements, alternative uses will also be apparent to those skilled in the art.

What is claimed is:

1. A remote control device comprising:
a camera;
a communication device;
a display; and
a controller operatively connected to the camera, the communication device and the display, the controller configured to
capture, via the camera, an image of an external device connected to a target device;
receive information about multimedia contents of the external device;
generate a virtual image of the multimedia contents of the external device based on the received information about the multimedia contents of the external device;
display a synthesized image of the image of the external device captured via the camera and the virtual image of the multimedia contents of the external device,
wherein, when the virtual image of the multimedia contents of the external device is selected and when the controller captures, via the camera, the target device, the controller transmits the multimedia contents of the external device to the captured target device.

2. The remote control device of claim 1, wherein the communication device is configured to receive the information about the multimedia contents of the external device from the external device when the camera is oriented towards the external device.

3. The remote control device of claim 1, wherein the multimedia contents are stored in the external device or are recorded in a recording medium readable by the external device.

4. The remote control device of claim 1, further comprising:
a user input device configured to receive a user input to select the displayed virtual image.

5. The remote control device of claim 4, wherein the user input device is a touchscreen of the display, and the user input is a touch input to the virtual image, the virtual image being displayed on the touchscreen.

6. The remote control device of claim 4, wherein the user input device is a keybutton, and the user input is a push of the keybutton while the virtual image is displayed on the display.

7. The remote control device of claim 1, wherein the controller is configured to generate a signal to select the virtual image if the virtual image is displayed on the display for a predetermined time.

8. The remote control device of claim 1, further comprising:
a user input device configured to receive a user input to continuously display the image and the virtual image,
wherein the controller is configured to perform a control operation, in response to the received user input, to continuously display the image and the virtual image regardless of an orientation direction of the camera.

9. An automatic control method for remotely controlling a device by a remote control device having a camera, a communication device, a display and a controller, the method comprising:
capturing, by the remote control device, an image of an external device connected to a target device;
receiving, by the remote control device, information about multimedia contents of the external device;
generating, by the remote control device, a virtual image of the multimedia contents of the external device based on the received information about the multimedia contents of the external device;
displaying, by the remote control device, a synthesized image of the image of the external device and the virtual image of the multimedia contents of the external device; and
when the virtual image of the multimedia contents of the external device is selected and when the controller captures, via the camera, the target device, transmitting the multimedia contents of the external device to the captured target device.

10. The automatic control method of claim 9, wherein the input is a touch input to the virtual image, the virtual image being displayed on a touchscreen of the remote control device.

11. The automatic control method of claim 9, wherein the input is a press of a keybutton of the remote control device while the virtual image is displayed.

12. The automatic control method of claim 9, further comprising:
generating, by the remote control device, a signal for selecting the virtual image if the virtual image is displayed for a predetermined time.

13. The automatic control method of claim 9, further comprising:
receiving, by the remote control device, a user input to continuously display the image and the virtual image after displaying the synthesized image; and
displaying, by the remote control device, the image and the virtual image continuously regardless of an orientation direction of the camera.

* * * * *